Figure 1:
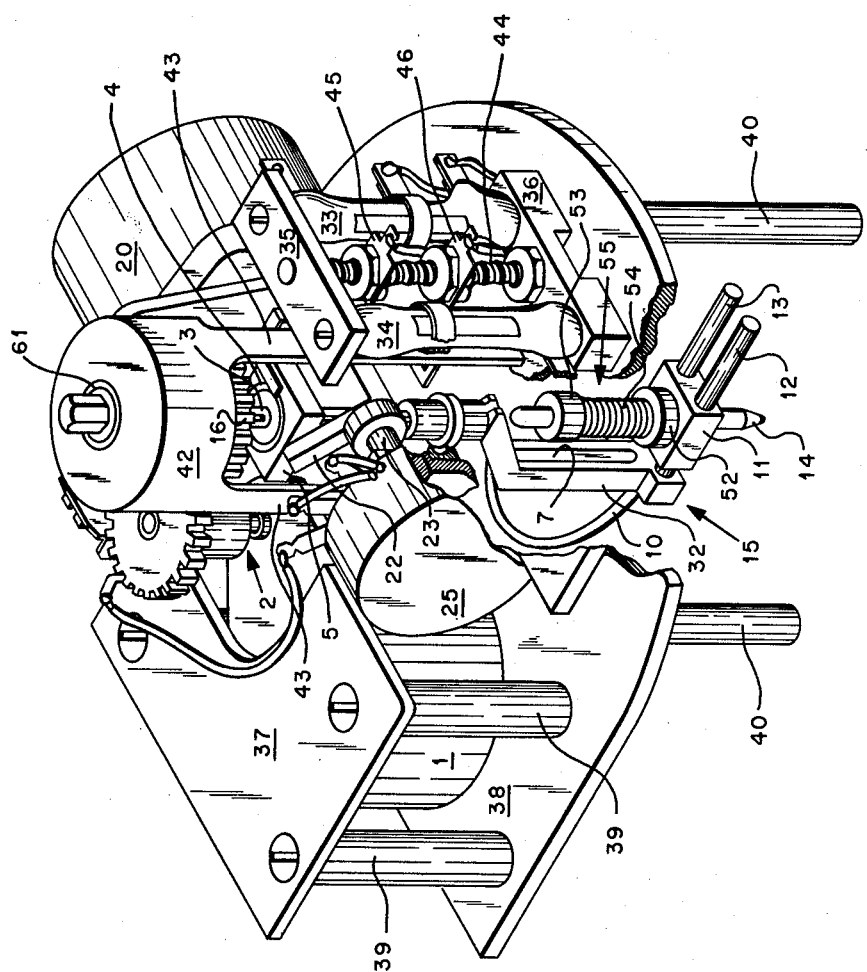

Sept. 4, 1956　　　M. J. IATESTA　　　2,761,753
MODULATING RECORDING DEVICE
Filed March 23, 1953　　　　　　　　　　2 Sheets-Sheet 1

INVENTOR.
MATTHEW J. IATESTA
BY
ATTORNEYS

Sept. 4, 1956 — M. J. IATESTA — 2,761,753
MODULATING RECORDING DEVICE
Filed March 23, 1953 — 2 Sheets-Sheet 2
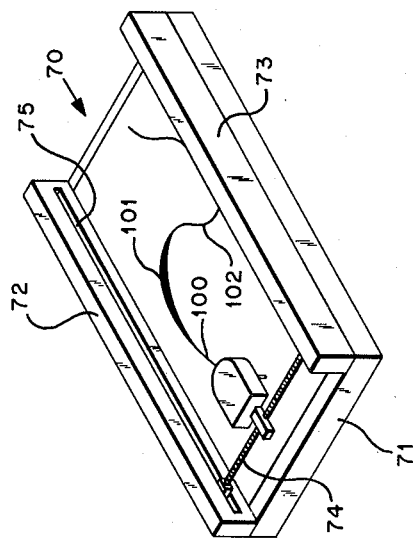
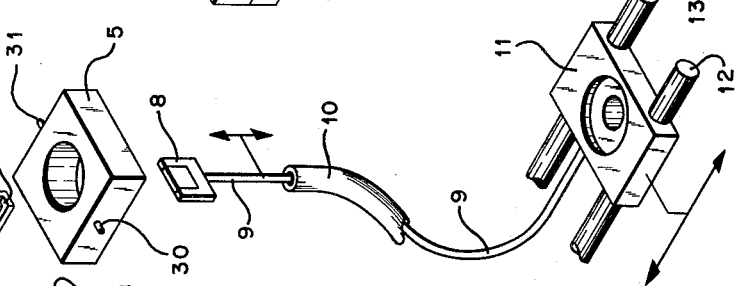
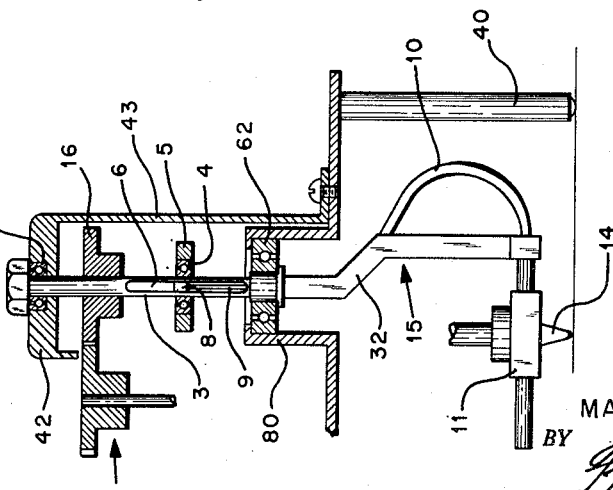
INVENTOR.
MATTHEW J. IATESTA
ATTORNEYS ded Sept. 4, 1956

2,761,753

MODULATING RECORDING DEVICE

Matthew J. Iatesta, Philadelphia, Pa.

Application March 23, 1953, Serial No. 344,253

22 Claims. (Cl. 346—62)

(Granted under Title 35, U. S. Code (1952), sec. 266)

The invention described herein may be manufactured and used by or for the Government of the United States of America for governmental purposes without the payment of any royalties thereon or therefor.

This invention relates to a modulating recording device wherein a particular recording trace of primary information has superimposed thereon a modulation of that trace to simultaneously represent necessary secondary information corresponding with the primary information.

Conventionally, in one applied use of this type of mechanism, a course plotting board has been utilized wherein a movable assembly including a vibrating pen or stylus was moved in relation to a map. The motion and consequent recording of the whole assembly gave one piece of information, as to the course of an airplane in flight, for example, while the amplitude of vibration of the pen or stylus gave another piece of information.

One important disadvantage of the conventional method is that the instantaneous direction of vibration must at all times be at right angles to the instantaneous direction of travel of the whole assembly in order to give an accurate and measurable amplitude of modulation. In many types of recordings right angle positioning is highly impractical as, for example, where the primary trace undergoes frequent deviation from a straight path. Initial cost, rapid breakdown of the apparatus, difficulty of maintenance and repair are some of the problems of previous known apparatus which are overcome by the instant invention.

Accordingly, one purpose of this invention is to facilitate elimination of positioning difficulty in compounding modulation on a primary trace.

Another purpose of the invention is to present a relatively inexpensive and accurate mechanism to perform the function of recording secondary intelligence on a trace of primary intelligence.

Still another aim of the invention is to present apparatus which will permit superimposing on a particular recording trace, a modulation of that trace to simultaneously present a second piece of necessary information and adapting the mechanism so as to be usable with existing conventional plotting board structure.

Another object of the invention is to present a device which will accomplish the function described herein by means of an apparatus which will be essentially rugged, less susceptible to breakdown and less cumbersome as well as superior in operational use.

Still another purpose of the invention is to present an apparatus which is simple to operate, which will obviate the use of specially trained personnel and which will eliminate the necessity for careful orientation while utilizing the equipment.

Other objects and many of the attendant advantages of this invention will be readily appreciated as the same becomes better understood by reference to the following detailed description when considered in connection with the accompanying drawings wherein:

Fig. 1 represents an assembly view of a preferred embodiment of the apparatus with the cover removed and with parts cut away for purposes of clarity in demonstrating the mechanism, Fig. 2 is a partial cross-sectional view of the showing of Fig. 1 with parts omitted for purposes of clarity, Fig. 3 is an exploded view of movable and adjustable elements showing the illustrative method of imparting drive to the rotating stylus carriage and the means of impressing deviation representing secondary intelligence upon the system, and, Fig. 4 is a pictorial representation of a conventional plotting board with a showing of the inventive device in operation to produce a primary trace and modulation indicating secondary intelligence superimposed upon that trace.

The inventive device is a recording instrument for producing a visible record on a record sheet. The recording unit includes a marking element to apply a trace to the record sheet in accordance with primary intelligence, as, for example, the course of an aircraft in flight and for superimposing secondary intelligence upon the primary intelligence as, for example, the width of a mineral deposit in the terrain over which the aircraft is flown. Means are provided for effecting relative motion between the record sheet and the recording unit in accordance with this primary intelligence and secondary intelligence. The position of the marking element is modulated in accordance with that secondary intelligence and this is accomplished by displacing the marking element radially from a position coincident with the axis of rotation of a continuously rotating supporting assembly the amount of displacement being dependent upon the secondary intelligence.

As best shown in Fig. 4 of the drawings, a conventional plotting board indicated generally at 70 may consist of a flat base member 71 and two elongated side members 72 and 73. A threaded rod 74 with which an indicating assembly, for example, the assembly of this invention, may be movably engaged by suitable means (not numbered) is supported by bearing members (not numbered) and rides in track slots 75 in side members 72 and 73. The thread of rod 74 may be a worm. Motion along tracks 75 imparts the longitudinal component of movement of the carriage relative to the board. Suitable means 77 meshing with rod 74 permits lateral motion of the carriage. A map insert (not numbered) may be disposed over the board member and a trace may be recorded thereon. The illustrative trace on the map shows primary information and zero secondary information in the region indicated at 100. In the region 101, the primary information has been modulated by secondary information and in the region designated 102 the value of modulation is again zero representing an area of negligible or zero secondary information.

Thus, if the recording unit is to indicate mineral deposits in the course of an aircraft, the primary information represented by the path direction 100, 101, and 102 might be the course of the aircraft and the secondary information might be mineral deposits located in the region 101, the amount of deposits at any location being represented by the diameter of the shaded area at that instantaneous point on the path.

Referring more particularly to the drawings of Figs. 1, 2 and 3, a motor 1, as for example, a 90 R. P. M. D. C. timing motor, drives a gear train 2 which in turn rotates a slotted shaft 3. Slotted shaft 3 is mounted between a bearing 61 in a casing member 42 and a bearing 62 in a sleeve member 80.

Slot 6 of slotted shaft 3 is formed by bifurcating to produce an elongated aperture between its bearing ends (not numbered). Slidably mounted on slotted shaft 3 is a round or circular bearing member 4 which is disposed within a square member 5 and is rotatable therein. The round member 4 may be surrounded by ball bearings and a ball bearing race (not numbered). Mounted internally of round member 4 and held in fixed angular relationship with respect to slotted shaft 3 by being disposed within the slot or elongated aperture 6 of the slotted shaft 3 is a clip 8 to which is attached a flexible cable or wire member 9 disposed within a rigid tubular member 10. The rigid tubular member 10 encloses wire member 9 through a major portion of its length and is reversely bent to dispose the wire member 9 parallel to shaft 3 at one end and angularly to shaft 3 at its other end. A carriage 11 is mounted and laterally slidable upon a pair of rod members 12 and 13. Mounted in the carriage is a stylus or marking pen 14. Disposed beneath and connected to the slotted shaft 3, is an offset revolvable crank member 15. Crank 15 is rigidly attached to the lower end of slotted shaft 3 and has a rod portion axially aligned with shaft 3, an angular section and an offset arm 32 in a plane parallel to, but offset from the longitudinal axis of shaft 3. The offset arm 32 terminates at its lower end in a widened base portion containing a plurality of apertures in which are attached rod members 12 and 13. Cable 9 may be passed through a centrally disposed aperture in the widened base of the offset arm 32. An elongated aperture 7 is formed in crank member 15 by bifurcation extending from the upper end of the rod portion to the base of crank 15. The rod portion is made hollow to permit passage therethrough of flexible cable 9. The two rod members 12 and 13 are rigidly connected to the off-set crank member 15 and are rotatable therewith. Also rotatable with the rotatable crank member 15 is the tubular member 10 which may be rigidly attached thereto at the base of the offset arm. Tubular member 10 extends from a point adjacent the top of the rod of crank 15 terminating at the base of the offset arm and is reversely bent through the crank elongated aperture 7. Slidably disposed within tubular member 10 and attached to the stylus carriage 11 at its lower end is flexible cable member 9. It can readily be appreciated at this point that turning of motor 1 will cause gear train 2 to drive gear 16 which turns slotted shaft 3. Rotation of slotted shaft 3 rotates the crank member 15 attached thereto. This rotation will cause revolution of the marking member 14 about an axis coincident with the axis of slotted shaft 3. Marking member 14, therefore, when disposed in a position aligned with slotted shaft 3, will describe a point upon rotation of crank member 15. When displaced from the position of alignment with the slotted shaft 3, the marking pen or stylus 14 will describe a circle.

A second motor 20 (as for example a D. C. timing motor operating at 5 R. P. M.) rotates a shaft 21 which is connected to and rotates a yoke member 22. Yoke member 22 may be connected to shaft 21 by means of a collar 24a integral with the outside face of its arm 27. A second shaft 23 disposed within a collar 24 on the arm 26 of yoke member 22 is directly connected to the variable contact arm (not numbered) of a potentiometer 25. Rotation of yoke member 22 rotates shaft 23 to rotate the movable contact arm of potentiometer 25. The potentiometer 25 and second motor 20 are part of a servo loop which may include a servo amplifier (not shown), so that upon receiving a secondary intelligence signal, this signal will be fed to the second motor 20 causing it to turn. At the same time, the second motor 20 is driving the contact arm of the potentiometer 25 to a position necessary to place the servo loop in balance whereupon the second motor 20 is caused to stop. In this manner the amount of rotation of shaft 21 due to rotation of the second motor 20 is governed so that an angle of rotation of the second motor 20 and shaft 21 corresponding to the magnitude of secondary intelligence received, is produced. Yoke member 22 is generally U-shaped in configuration and has a pair of arms 26 and 27. Disposed on an inner face of each of the arms 26 and 27 is a slot or groove 28 and 29. The square plate 5 has a pair of oppositely protruding pin or boss members 30 and 31 which are disposed within and ride in the slots 28 and 29 in the arms 26 and 27 of yoke member 22. Rotation of the yoke member 22 will therefore cause square plate member 5 to be moved up or down longitudinally of slotted shaft 3. The clip member 8 being fixedly disposed within the circular member 4 of square plate member 5 will move up and down with the square plate member 5. This will pull or push cable member 9, the motion being transmitted therethrough to carriage 11. Thus, if the assembly of square member 5, circular member 4 and clip 8 are moved upwardly of the shaft by rotation of yoke 22, a pulling action results displacing the carriage 11 and hence stylus 14 in a direction toward the offset arm 32 of the revolving crank member 15. Movement of square plate member 5 and clip 8 downwardly along the shaft will push carriage 11 in a direction away from the offset arm 32 of the crank revolving member 15. Thus, it may be seen that rotation of the second motor 20 will cause rotation of yoke member 22 causing square plate 5 and wire member 9 to move up or down with respect to slotted shaft 3. A pair of limit switches 45 and 46 are disposed near the top and near the bottom of slotted shaft 3. Upon contact of the square plate member 5 with either of the limit switches 45 and 46, an electrical circuit is closed, stopping action. A pair of variable wire wound resistors 33 and 34 are held between two plates 35 and 36 and are used to regulate the speed of motors 1 and 20. The structure is mounted and supported by two plate members 37 and 38 which are held apart by spacer members 39. The stand may be mounted upon three legs 40 riding upon ball bearings (not numbered) for relatively frictionless sliding travel. Disposed around the equipment is a cover member (not shown). A casing member 42 having depending tines 43 terminating in chassis mounting lugs (not numbered) surrounds the slotted shaft 3. Tines 43 are spaced to permit meshing of gear train 2 with gear 16 and to facilitate location and assembly of parts. A threaded Lucite rod 44 is disposed between resistor clamping plate members 35 and 36. Internally threaded bushings or nuts (not numbered) are mounted on Lucite rod 44 to provide adjustable support for limit switches 45 and 46. These bushings or nuts also provide support for electrical contact legs (not numbered).

Suitable well known fastening means such as screws, bolts, pins, cotter pins and set screws, not numbered, may be utilized to keep the various parts in fixed position. Carriage 11 may have an integral sleeve member (not numbered) normal to its upper face and aligned with an aperture (not numbered) extending vertically through the central portion of the carriage 11 through which sleeve and aperture the stylus 1 may be mounted and held by means of a spring bias member 55 consisting of a lower spring collar 52, an upper spring collar 53 and a spring member 54 separating the collars 52 and 53.

*Operation*

In neutral position the stylus 14 is rotated by and has a position aligned with and directly under the slotted shaft 3. Motor 1 transmits motion through gear train 2 and gear 16 causing rotation of the slotted shaft 3. Rotation of slotted shaft 3 in turn causes fixedly attached crank member 15 to rotate causing the stylus 14 to describe a dot when in neutral position. If a vehicle containing the instant device, as for example, an aircraft, is in motion, movement along track slots 75 and worm gear threaded rod 74 will cause a line to appear on the record sheet, which may be made to follow a path across the record sheet described by the vehicle. Additional information about the route of the vehicle may be required, as for example, the amount of deposits or of radiation in the terrain over which the vehicle is moving. A device for giving this secondary intelligence, as for example, a Geiger counter and associated equipment if radiation is to be detected, may be used to drive the second motor 20. Driving of the second motor 20 in turn imparts rotation to shaft 21 causing the yoke member 22 to rotate and the flat plate member 5 to move up or down on slotted shaft 3, in accordance with the information derived from the source of secondary intelligence and governing by the servo loop accordingly. Motion of the plate member 5 up and down according to the secondary intelligence pulls or pushes the cable member 9 thus causing the carriage 11 to be displaced to and from a position of alignment with the slotted shaft 3 in turn causing a circular trace, the magnitude of which is dependent upon the magnitude of intelligence fed into the second motor 20. Inasmuch as the apparatus is moving along a line, a circular trace of amplitude proportional to the fed in secondary intelligence is described along the path of the vehicle. The amount of displacement of the stylus or marking pen 14 will determine the radius or the diameter of circles of the circular trace. Thus, secondary intelligence such as characteristics concerning the terrain in the path of the moving vehicle may be determined. As hereinbefore indicated, motion of the square plate member 5 to extreme limit position in either direction will limit the size of the circles which are scribed, thus limiting the maximum amount recorded and protecting the gear. The resistors 33 and 34 may be varied in order to drive motors 1 and 20 to a speed corresponding to the speed of a particular type of vehicle whereby a correct trace may be imparted to the record sheet.

It is therefore seen that generally speaking, this invention comprises a movable assembly on which is mounted a rotating pen, stylus or other marking device. When this marking device is at the axis of rotation, movement of the whole assembly will merely create a line. However, if the radius of rotation is modulated, modulation of the line occurs. This amplitude modulation, representing a second quantity to be measured, is accomplished without regard for the necessity of orientation at right angles to the instantaneous direction of travel of the whole assembly to secure an accurate and measurable amplitude of trace, since the marking or indicating device is rotating and the modulation is omni-directional. This omni-directional type of modulation introduced by variation of the radius of rotation eliminates the necessity of modulation positioning with respect to the primary trace. Therefore, we may produce an amplitude modulated trace by modulation of a radius of rotation rather than by a vibratory technique.

It will readily be apparent that the apparatus shown is merely an illustrative embodiment of the subject invention, and that variations thereof will readily occur to one skilled in the art. For example, an alternate configuration of the device could include various gearing arrangements such as rack and pinion mountings or translation of motion or differential gearing to allow both rotation and injection of positioning information. The use of linkages may also be included as an alternate solution. Alternate or additional means for varying the speed of rotation for best results could be incorporated in the apparatus. Alternate means of drive could be introduced without changing the inventive concept herein described. For example, a clutch may be substituted in place of the direct motor drive the clutch being actuated by some other means. Substitution and/or inclusion of electronic vehicles of transmission in place of mechanical means shown or of mechanical means in place of some of the electrical components or means may be freely introduced without departing from the principles of the inventive teaching. Variations in method of rotation or revolution of the stylus or marking device could be instituted without departure from the inventive principles. An indicating device other than a marking device could be used.

Other components may be introduced into the system without departing from its teachings. Value and size of components are merely illustrative.

Obviously, many modifications and variations of the present invention are possible in the light of the above teachings. It is therefore, to be understood that within the scope of the appended claims the invention may be practiced otherwise than as specifically described.

I claim:

1. In a recording instrument including a record sheet, a recording unit for applying a trace to the record sheet in accordance with primary intelligence and secondary intelligence and means for effecting relative motion between the record sheet and the recording unit in accordance with the primary intelligence, the recording unit comprising a rotatably mounted shaft terminating in an offset portion, a marking element supported on the offset portion of the shaft with the axis of the marking element in alignment with the axis of rotation of the shaft and means for transversely displacing the marking element from the axis of rotation, the amount of displacement being dependent upon the secondary intelligence.

2. In a recording instrument including a record sheet, a recording unit for applying a trace to the record sheet in accordance with primary intelligence and secondary intelligence and means for effecting relative motion between the record sheet and the recording unit in accordance with the primary intelligence, the recording unit comprising a marking element, a rotatably mounted shaft terminating in an offset portion, means including a slide bar secured to the off-set portion of the shaft adjacent the end thereof and extending normally to the axis of rotation, the marking element slidably mounted on the slide bar and having its axis in alignment with the axis of rotation of the shaft and means for varying the position of the marking element on the slide bar relative to the axis of rotation, the position of the marking element being dependent upon the secondary intelligence.

3. In a recording instrument, having means to indicate a path representing primary intelligence, means to modulate said primary intelligence path comprising a first motor, transmission means to transmit power imparted by said motor, rotational means driven by said transmission means, an indicating device rotated by said rotational means about an axis coincident with said rotational means, said indicating device describing an unmodulated trace in no signal position, means to displace said indicating device comprising a second motor responsive to signals describing secondary intelligence, transmission means to transmit power imparted by said second motor, means to convert said transmitted power to displacement of said indicating device from the axis of the rotational means whereby the indicating device will describe a circular path about instantaneous points on the primary intelligence path.

4. A recording device comprising a first motor, a gear train driven by said motor, a rotating shaft having rotation imparted by said gear train, a crank member secured to said shaft, a support secured to said crank member, a carriage adjustably mounted on said support, rotation of said shaft rotating said offset arm and said carriage, an indicating device mounted on said carriage, said indicating device when stationary with respect to a supporting surface describing a dot on being aligned with the axis of said shaft, and means to displace said carriage in accordance with fed in information, the amount of displacement from a position of no information corresponding to the magnitude of information received, the indicating device thereby describing a circle of diameter proportional to the magnitude of information received.

5. The device of claim 4 wherein the crank comprises a sleeve and a rod member attached to and aligned with said shaft, an arm member disposed angularly to said rod member and an offset arm substantially parallel to the longitudinal axis of said shaft but displaced therefrom, the rod member, angular arm and offset arm having a continuous slot substantially the length thereof, the offset arm terminating in a widened portion, the widened portion having a plurality of apertures therein, and the support comprises a pair of rod members adjustably fixedly secured in a plurality of said apertures and the carriage includes a plate having apertures therein to slidingly receive said rod members for lateral displacement of the plate along their length.

6. The device of claim 5 wherein the means for displacing said carriage comprises a second motor of relatively low speed, the motor having an output shaft, a substantially U-shaped yoke member attached to said output shaft, said yoke having a pair of arms extending perpendicular to the longitudinal axis of said output shaft, the arms having a connecting member parallel to the longitudinal axis of the shaft, a slot disposed on an inner surface of each arm, the slots being in opposed relationship, a plate member slidable along the length of said rotating shaft, said plate member having pin members oppositely disposed, said pin members being receivable in the slots of the yoke arm members, rotation of the second motor and output shaft causing rotation of the yoke thereby forcing the pin members to move along the slots and providing longitudinal motion of the plate along the rotating shaft.

7. The device of claim 6 wherein the plate member includes a circular inner member rotatable with said shaft, said inner member having an elongated flexible member attached thereto, a tubular guide surrounding the flexible member through a substantial portion of the length of said flexible member, the tubular member being joined at one end with said circular member and at its other end with the widened base portion of said offset arm, the elongated flexible member extending through an aperture in said widened base member and being attached to said carriage whereby motion of said square plate longitudinally of said rotatable shaft will be converted into lateral motion of the carriage along the rods.

8. The apparatus of claim 7 including a platform member, supports to support said motors mounted on said platform, said platform having an aperture disposed therein, a rigid sleeve member mounted in said platform and having its longitudinal axis aligned with the aperture, a shaft case member mounted on said platform, said sleeve being disposed within and concentric with said shaft casing member, an aperture through the top portion of said case said rotatable shaft being rotatably mounted in said case aperture and said sleeve, bearing members to permit free rotation of said rotatable shaft, said shaft being bifurcated substantially throughout the non-bearing portion of its length to form a continuous slot, means to secure the flexible member to the rotatable circular plate portion of the square plate member, securing means constantly engaging said bifurcated portion thereby preventing torsion of the wire member, the rotatable shaft driving gear being fixedly mounted on said shaft concentric thereto.

9. The device of claim 8, said carriage having an aperture disposed therethrough, a marking device mounted in said aperture in a plane parallel to the longitudinal axis of said rotatable shaft, a second aperture in said carriage perpendicular to said marking device, the elongated flexible member being secured in said second aperture, whereby force exerted on the flexible member will move the marking device in a lateral direction with respect to the offset arm.

10. The device of claim 9 including means to vary the speed of the motors whereby they may be adjusted to correspond with the velocity of a carrying vehicle.

11. The apparatus of claim 6 including means connecting said yoke member to a second shaft, means on said second shaft to drive a variable resistor contact arm, a servo loop including said variable resistor and said second motor, said servo loop limiting the rotation of said second motor to an amount in accordance with the magnitude of secondary intelligence to be transmitted to the marking device.

12. The apparatus of claim 11 including a servo amplifier in said servo loop, said servo amplifier being actuated in accordance with the signal developed across the resistor portion engaged by said resistor contact arm, means to balance said potentiometer resistor contact arm travel and rotation of said second motor proportional to the fed in secondary intelligence.

13. A recording instrument arranged to be displaced in accordance with a primary intelligence comprising means to effect rotation including a first power source, power transmission means to transmit power from said power source, a shaft driven by said transmission means, a crank member including an offset arm rotated by said shaft, a movable carriage, means rotatable with said offset arm to support the movable carriage, said last named means being disposed in angular relation to said shaft, an indicating member mounted on said carriage and means to superimpose modulation on said rotation in accordance with secondary intelligence.

14. The apparatus of claim 13 wherein said crank member comprises a tubular member axially aligned with the longitudinal axis of said shaft, means to fixedly secure the tubular member to the shaft, an arm member angularly disposed to said tubular member, an offset arm having its longitudinal axis disposed in a plane parallel to the plane of the longitudinal axis of the shaft, a widened base portion of the offset arm, said crank member being bifurcated throughout a major portion of its length to form an elongated aperture therethrough extending approximately from the means to fixedly secure the tubular member to the shaft to the base portion, said means to fixedly secure the tubular member to the shaft having an aperture therethrough, thereby permitting a member to be extended through the crank member.

15. The apparatus of claim 13, said means to support the movable carriage comprising a plurality of rods connected to said offset arm perpendicular thereto, said carriage having apertures to slidingly receive said rods.

16. The apparatus of claim 14, said shaft means being rotatably supported between an upper bearing surface and a lower bearing sleeve, said shaft being bifurcated substantially throughout its length to form an elongated aperture therethrough approximately from said upper bearing surface to said lower bearing sleeve, a member slidingly supported by said shaft and rotatable therewith, said member being concentric with the shaft, a clip member disposed in said slidable member and having a portion engaged with said elongated aperture, a flexible cable member attached at one end to said clip member and at its other end passing through said crank and being attached to said carriage, a rigid tubular guide member surrounding said wire member throughout a major portion of its length, said tubular member extending through the tubular member of said crank, said cable encasing tubular member passing through the bifurcated portion of said crank and being reversely bent and terminating in a direction in angular relation with said offset arm and connected thereto, thereby permitting longitudinal motion of said slidable member disposed on said shaft to be transmitted through the cable member to displace the carriage with respect to the offset arm of said crank.

17. The device of claim 13 wherein the means to superimpose modulation on the rotation in accordance with secondary intelligence comprises a second power source, output means on said second power source, a yoke member driven by said output means, said yoke member having two arm members and a connecting member, the yoke member being rotated by said power source about an axis parallel to the longitudinal axis of the connecting member, a plate member disposed on said shaft and slidable therewith, said plate member having a pair of opposed pins on opposite edges, said pins riding in said slots whereby rotation of said yoke member will move the plate member along the longitudinal axis of the shaft.

18. The apparatus of claim 17, said second power source comprising a motor, said output means comprising an output shaft of said motor, said yoke having a collar adapted to be secured to said shaft, an inner bearing surface of said collar being disposed concentric with said output shaft whereby the connecting member of said yoke is disposed on an axis parallel to the axis of said output shaft, a second collar disposed on said yoke and opposing said first collar, a potentiometer having a shaft to rotate a contact member of said potentiometer, said last named shaft being insertable in said second collar, output of said potentiometer being fed into a servo loop including said second motor, said servo loop serving to limit the rotation of said second motor to an angle in accordance with secondary intelligence fed into the system, the secondary intelligence comprising the modulation on the primary intelligence.

19. The apparatus of claim 17, said plate member having disposed therein a circular member, said circular member being rotatable within said plate member and bearingly supported therein, said circular member being slidably disposed on said shaft driven by the first power source, means to transmit longitudinal motion of the plate and circular member along the rotating shaft driven by the first power source to said movable carriage to effect a displacement of the carriage with relation to the crank offset arm.

20. The apparatus of claim 19, said last named means comprising a cable member secured at one end to said carriage and at its opposite end being secured to a clip member, the clip member being disposed internally of said circular member and rigidly secured thereto, means to rotate said cable member with said shaft, said cable member being disposed through said offset arm, a rigid tubular member surrounding said cable member throughout a major portion of its length and preventing motion of the cable member in directions other than along its longitudinal length, motion of said plate member longitudinally with respect to said first power source driven shaft being transmitted through said cable to effect displacement of said carriage with respect to the offset arm of the crank.

21. The apparatus of claim 16 including a plate member, a pair of oppositely disposed pin members protruding therefrom, the member slidingly supported by the bifurcated shaft being enclosed in and bearingly supported by said plate, motion of the slidable member along the longitudinal axis of the shaft thereby causing the plate member to move coincidentally with the slidable member, the means to superimpose modulation on the rotation including a second power source comprising a motor having an output shaft, a U-shaped yoke member including a pair of arms and a connecting member, the connecting member being disposed in a plane parallel to the plane of the motor output shaft, and connected thereto, thereby permitting rotation of said output shaft to rotate said yoke about an axis aligned with the longitudinal axis of the output shaft, a second shaft secured to said yoke on an axis aligned with the longitudinal axis of the motor output shaft, a potentiometer having a slidable contact, the contact being connected to said second shaft whereby rotation of the yoke will cause output resistance change of the potentiometer, a servo loop system including said potentiometer and said motor to control the angle of rotation of the output shaft in accordance with desired information, a slot disposed on each arm of the yoke, said slots being disposed in opposed inner faces of said yoke, the plate member being positioned between the opposite arms of the yoke, the pin members being slidingly disposed in said slots, said slots thereby forming a track, rotation of said motor thereby causing rotation of said yoke and forcing the pins along said track to longitudinally displace said plate member on the bifurcated shaft, the displacement exerting tension on the cable, thereby causing the cable to displace the carriage along the rod supports with respect to the offset arm and changing the dimension of a circle described by the indicating element upon rotation of the offset arm about the bifurcated shaft axis, the dimensional change of the circle conforming to a modulation of a primary trace in accordance with intelligence actuating the motor.

22. In a recording instrument including a record sheet, a recording unit comprising a rotatable marking element assembly including an adjustable marking element for applying a trace to the record sheet in accordance with primary intelligence and secondary intelligence, means for effecting relative motion between the record sheet and the recording unit in accordance with the primary intelligence, means for maintaining continuous unidirectional rotational movement of said marking element assembly about an axis of rotation, and independently operable means for modulating the position of the marking element in accordance with secondary intelligence which comprises means for displacing the marking element from the axis of rotation of said marking element assembly, the amount of displacement being dependent upon the secondary intelligence.

References Cited in the file of this patent
UNITED STATES PATENTS

| 1,039,093 | Brown | Sept. 24, 1912 |
| 2,134,581 | Rowell | Oct. 25, 1938 |